United States Patent
Dolzinski et al.

(10) Patent No.: US 9,033,272 B2
(45) Date of Patent: May 19, 2015

(54) ARRANGEMENT AND AIRCRAFT OR SPACECRAFT

(75) Inventors: Wolf-Dietrich Dolzinski, Ganderkesee (DE); Michael Kolax, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 116 days.

(21) Appl. No.: 13/234,611

(22) Filed: Sep. 16, 2011

(65) Prior Publication Data

US 2012/0068012 A1 Mar. 22, 2012

Related U.S. Application Data

(60) Provisional application No. 61/385,310, filed on Sep. 22, 2010.

(30) Foreign Application Priority Data

Sep. 22, 2010 (DE) .......................... 10 2010 041 181

(51) Int. Cl.
*B64C 1/40* (2006.01)
*B64C 1/06* (2006.01)
*B64C 1/12* (2006.01)

(52) U.S. Cl.
CPC . *B64C 1/067* (2013.01); *B64C 1/12* (2013.01); *B64C 1/40* (2013.01); *Y02T 50/46* (2013.01)

(58) Field of Classification Search
CPC ................ B64C 1/00; B64C 1/12; B64C 1/40
USPC ............ 244/1 N, 119, 120, 121, 129.3, 129.4
See application file for complete search history.

(56) References Cited

U.S. PATENT DOCUMENTS

| | | | |
|---|---|---|---|
| 3,867,244 A | | 2/1975 | Adams |
| 5,577,688 A | * | 11/1996 | Sloan ......................... 244/117 R |
| 5,779,193 A | * | 7/1998 | Sloan ......................... 244/117 R |
| 5,897,079 A | * | 4/1999 | Specht et al. .............. 244/118.5 |
| 6,491,254 B1 | * | 12/2002 | Walkinshaw et al. ...... 244/118.5 |
| 7,118,069 B2 | * | 10/2006 | Novak et al. ................. 244/119 |
| 2005/0044712 A1 | * | 3/2005 | Gideon et al. ............. 29/897.32 |

FOREIGN PATENT DOCUMENTS

DE         422 9158 A1     3/1994
DE   10 2007 008988     8/2008
(Continued)

OTHER PUBLICATIONS

German Office Action for DE 10 2010 041 181.7 dated Jun. 10, 2011.
(Continued)

*Primary Examiner* — Justin Benedik
(74) *Attorney, Agent, or Firm* — Jenkins, Wilson, Taylor & Hunt, P.A.

(57) ABSTRACT

The present invention provides an arrangement, in particular for an aircraft or spacecraft, comprising an outer skin portion, the outside of which comes into contact with the atmosphere; a facing portion, which is arranged on the inside of the outer skin portion; a gap which is formed between the outer skin portion and the facing portion; and a device by means of which an airstream can be passed through the gap at a sufficient temperature to displace the dew point into the outer skin portion.

9 Claims, 2 Drawing Sheets

(56) References Cited

FOREIGN PATENT DOCUMENTS

| | | |
|---|---|---|
| DE | 10 2008 025389 | 7/2009 |
| EP | 1510454 A1 | 3/2005 |
| GB | 2 433 483 A | 6/2007 |

OTHER PUBLICATIONS

German Office Action for Application No. 10 2010 041 181.7 dated May 15, 2014.

* cited by examiner

ARRANGEMENT AND AIRCRAFT OR SPACECRAFT

CROSS-REFERENCE TO RELATED APPLICATIONS

This application claims the benefit of and priority to U.S. Provisional Application No. 61/385,310, filed Sep. 22, 2010 and German Patent Application No. 10 2010 041 181.7, filed Sep. 22, 2010, the entire disclosures of which are herein incorporated by reference.

FIELD OF THE INVENTION

The present invention relates to an arrangement and to an aircraft or spacecraft.

Although applicable to any aircraft or spacecraft, the present invention and the set of problems on which it is based are described in greater detail in relation to a passenger aircraft.

In the passenger aircraft generally known nowadays, glass wool mats perform both thermal and acoustic insulating functions. They are applied directly to the inside of the outer skin of the aircraft. In an inward direction, the cabin facing is located before the glass wool mats. The glass wool mats insulate the outer skin from the heated cabin, in such a way that the skin remains as cold as possible, so as to minimise heat transfer to outside the aircraft. However, the glass wool mats do not provide airtight sealing. Thus, cabin air is constantly reaching cold regions of the outer skin. This leads to airborne moisture from the cabin air condensing out. This results in considerable amounts of water collecting in the fuselage of the aircraft and necessitating corresponding maintenance and inspection measures, in particular to prevent corrosion. The glass wool mats are also regularly changed or dried back out to reduce the weight and restore the insulating function thereof.

DE 10 2008 025 389 A1 discloses a method for insulating an aircraft cabin in which the corresponding insulation is provided by guiding the cabin air, cooled or heated, through a gap in the cabin wall. However, this solution still has the problem of water condensing out of the cabin air, and this is associated with the drawbacks described above.

Moreover, DE 10 2007 008 988 A1 discloses guiding a heated airstream through a gap between an outer skin and an insulating member of an aircraft fuselage. In this case, the dew point is in the insulating member. Thus, this configuration still has the drawback of moisture condensing out of the airstream in the gap.

SUMMARY OF THE INVENTION

The object of the present invention is therefore to provide an arrangement for an aircraft or spacecraft which prevents water from condensing out of an airstream.

Accordingly, an arrangement, in particular for an aircraft or spacecraft, comprising the following is provided: an outer skin portion, the outside of which comes into contact with the atmosphere; a facing portion, which is arranged on the inside of the outer skin portion; a gap which is formed between the outer skin portion and the facing portion; and a device by means of which an airstream can be passed through the gap at a sufficient temperature to displace the dew point into the outer skin portion.

An aircraft or spacecraft comprising the arrangement according to the invention is further provided.

The idea on which the present invention is based involves preventing moisture in the airstream from condensing out by passing the airstream through the gap at a sufficient temperature to displace the dew point into the outer skin portion. This has various advantages. First, corrosion problems, linked to the condensed-out moisture which is otherwise present, are reduced. Further, it is not necessary to dry back out or change wet glass wool mats. Further, it is possible to increase the moisture in the cabin air of the aircraft or spacecraft to the dew point, without this resulting in condensation along the outer skin. The higher air humidity is more physiologically acceptable for the passengers and thus increases their well-being.

Advantageous configurations and improvements of the invention may be found in the dependent claims.

The dew point (also known as the dew point temperature) is the temperature at which there is equilibrium between condensed and evaporating water on an object when moisture is present in the air, i.e. in other words the temperature at which condensate actually starts to form.

Displacing the dew point into the outer skin portion in accordance with the invention means that there is a temperature gradient in the thickness direction of the outer skin portion, from very cold (in particular at cruising altitude) on the outside of the outer skin portion facing the atmosphere to comparatively warm on the inside of the outer skin portion facing the cabin, the dew point being located within the outer skin portion in the thickness direction.

In a preferred development of the arrangement according to the invention, the facing portion has acoustic and/or thermal insulation. The thermal insulation provides that the space enclosed by the facing portion, for example for passengers, can be at a first temperature and the airstream which is passed through the gap can be at a second temperature. In this way, the first and second temperature can advantageously be set independently of one another. The acoustic insulation protects the passengers from noise, in particular from the engines.

In a further preferred development of the arrangement according to the invention, the facing portion has one or more air chambers for thermal insulation. The air chambers offer a simple option for providing thermal insulation.

It is particularly preferable for the facing portion to be formed as a foam comprising the air chambers. There are already numerous air chambers inherently present in a foam.

In a further preferred development of the arrangement according to the invention, one or more heating members for increasing the temperature of the airstream are arranged in the facing portion. In this way, the airstream can be heated evenly over the spatial extent thereof, and this in turn leads to an even temperature distribution on the inside of the outer skin portion facing the gap. In this way, the dew point can in turn be set evenly over the outer skin portion, in a substantially planar manner in the thickness direction in the outer skin portion.

In a further preferred development of the arrangement according to the invention, the facing portion is formed as a tube, which is arranged substantially coaxially in the outer skin portion which is also formed as a tube. In this way, sound can very effectively be kept away from the passengers accommodated inside the facing portion formed as a tube. Moreover, this provides the gap between the facing portion and the outer skin portion in a simple manner.

In a further preferred development of the arrangement according to the invention, the facing portion is coated with an intumescent material on the side thereof remote from the gap. This provides simple fireproofing against a fire in the cabin for example.

In a further preferred development of the arrangement according to the invention, the facing portion is formed with a noise-absorbing surface structure on the side thereof facing the gap. This provides a further acoustic improvement.

In a further preferred development of the aircraft or spacecraft according to the invention, the facing portion defines a cabin of the aircraft or spacecraft.

BRIEF DESCRIPTION OF THE DRAWINGS

The invention is described in greater detail in the following by way of embodiments, with reference to the appended drawings, in which.

DESCRIPTION OF EXEMPLARY EMBODIMENTS

Figure 1:
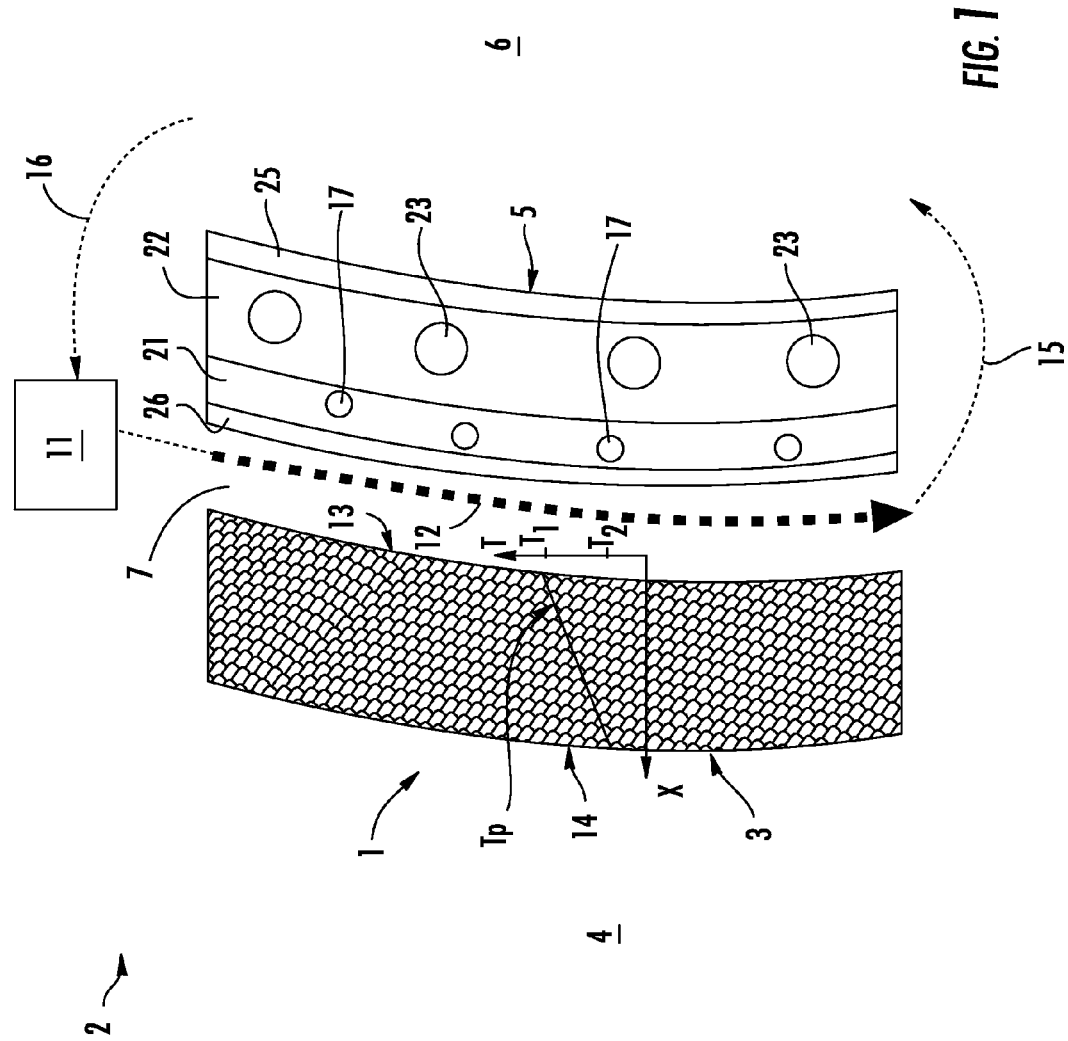
FIG. 1 is a schematic section through an arrangement according to an embodiment of the present invention.

In the figures, like reference numerals denote like or functionally equivalent components unless otherwise stated.

FIG. 1 is a section through an arrangement 1 of an aircraft generally denoted as 2 according to an embodiment of the present invention.

The arrangement 1 comprises an outer skin portion 3, the outside of which comes into contact with the atmosphere 4. The outer skin portion may for example be formed from aluminium (which in the present document also includes aluminium alloys) or a fibre composite material, for example carbon-fibre-reinforced plastics material (CFRP) or GLARE.

The arrangement 1 further comprises a facing portion 5 which is arranged on the inside of the outer skin portion 3. The facing portion 5 defines a cabin 6 of the aircraft 2, in which passengers may for example be accommodated.

A gap 7 is formed between the outer skin portion 3 and the facing portion 5.

The arrangement 1 further comprises a device 11 which passes an airstream 12 through the gap 7 in the direction indicated by the arrow. The airstream 12 is at a sufficient temperature to displace the dew point TP into the outer skin portion 3.

FIG. 1 shows the progression of the temperature T in the thickness direction X of the outer skin portion 3, overlaid on the outer skin portion 3 in FIG. 1 for clearer understanding. It can be seen that the inside 13, which is heated by the airstream 12, of the outer skin portion 3 is at a high temperature T1, for example 15° C. By contrast, the outside 14 of the outer skin portion 3 is at a low temperature T2, for example −50° C. (typical for an aircraft at cruising altitude). The temperature T decreases substantially linearly in the thickness direction from the inside 13 to the outside 14 of the outer skin portion 3. Since the dew point TP is inside the outer skin portion 3, the moisture in the airstream 12 does not condense on the inside 13 of the outer skin portion 3. In this context, the dew point TP refers to the point which the airstream 12 should theoretically reach and which is sufficiently cold that the moisture contained in the airstream 12 condenses out. Since this is not physically possible, the dew point TP being located inside the outer skin portion 3, condensation of the moisture from the airstream 12 is effectively prevented. In this way it is even possible to raise the humidity in the airstream 12 to above the currently conventional values of approximately 15% without resulting in condensation. For this purpose, the temperature of the airstream 12 or the temperature T1 at the inside 13 of the outer skin portion 3 need only be correspondingly raised. A correspondingly higher humidity in the airstream 12 which is supplied to the passengers in the cabin 6 (as indicated by the arrow 15) increases their well-being.

The device 11 can for example be in the form of the air-conditioning system which is already conventionally used in aircraft. This can for example take air from the cabin 6 (as indicated by the arrow 16), heat it and pass it through the gap 7. Since the temperature T1 at the inside 13 of the outer skin portion 3 depends not only on the temperature of the airstream 12, but also for example on the speed thereof, the device 11 may also be formed in such a way that it can inter alia also control the speed of the airstream 12 in an adapted manner.

The temperature of the airstream 12 and thus the temperature T1 of the inside 13 of the outer skin portion 3 can further be controlled by heating members 17, which are arranged distributed along the gap 7, for example in a layer 21 of the facing portion 5. For example, the layer 21 may be a heating mat. The heating members 17 may in particular be electrically powered to generate heat. This provides that the airstream 12 has an even temperature along the gap 7, and this in turn means that the inside 13 of the outer skin portion 3 also has an even temperature T1 along the gap 7. In this case, "along" refers to the direction of movement of the airstream 12.

The facing portion 5 may further comprise a thermal insulating layer 22 having a plurality of air chambers 23. For example, the layer 22 may be in the form of a foam. In this way, the temperature in the cabin 6 can be controlled substantially independently of the temperature of the airstream 12, i.e. there is thermal decoupling between the cabin 6 and the gap 7.

For improved fireproofing, the facing portion 5 may further comprise a cabin-side intumescent layer 25 which expands in the case of a fire in the cabin 6 and protects the outer skin portion 3 from the fire.

To protect in particular the passengers in the cabin 6 from noise, the facing portion 5 may be formed, for example on the side thereof facing the gap 7, with a noise-absorbing surface structure 26.

Figure 2:
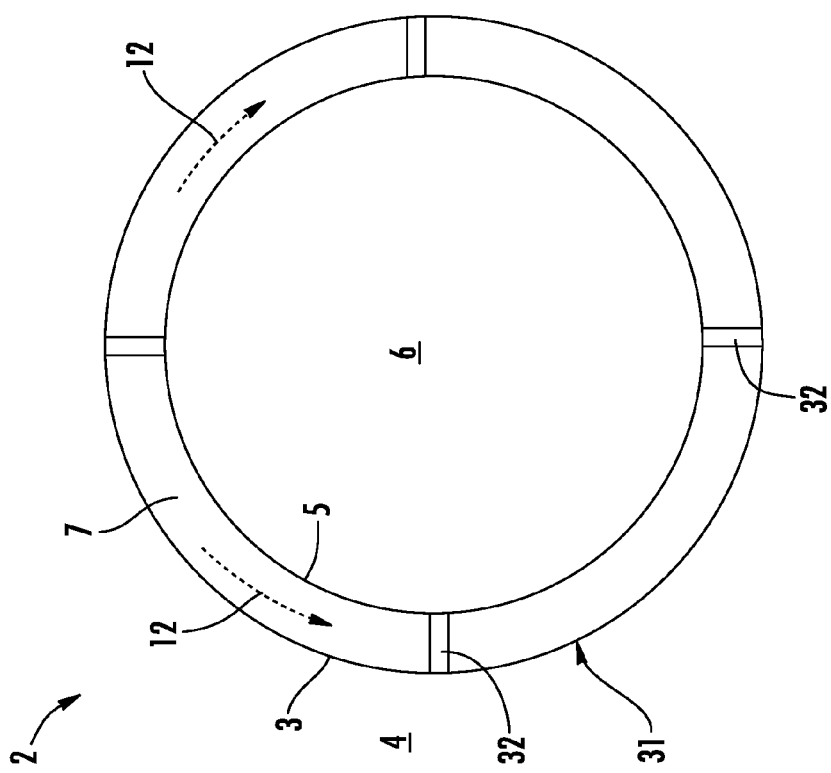
FIG. 2 is a schematic section through a fuselage of an aircraft or spacecraft according to an embodiment of the present invention.

FIG. 2 is a cross-section through a fuselage 31 of the aircraft 2 of FIG. 1 according to an embodiment of the present invention.

It can be seen in FIG. 2 that the outer skin portion 3 and the facing portion 5 are each formed as tubes, which are arranged coaxially one inside the other. In this way, the gap 7 between the outer skin portion 3 and the facing portion 5 is formed in a simple manner. The tubes 3, 5 are held in relation to one another by a small number of spacers 32. The spacers 32 are formed from a material which is as highly thermally insulating as possible, for example plastics material. The annular gap 7 surrounding the cabin 6 provides good thermal and acoustic insulation.

The technical features disclosed in connection with FIG. 1 apply correspondingly to the embodiment of FIG. 2.

Although the present invention has been disclosed by way of preferred embodiments, it is not limited thereto, but can be modified in various ways. It should further be noted that the embodiments and developments disclosed for the arrangement according to the invention apply correspondingly to the aircraft or spacecraft according to the invention, and vice versa. In the present document, the term "a" does not exclude a plurality.

LIST OF REFERENCE NUMERALS 1 arrangement
2 aircraft 3 outer skin portion
4 atmosphere
5 facing portion
6 cabin
7 gap
11 device
12 airstream
13 inside
14 outside
15 arrow
16 arrow
17 heating member
21 layer
22 layer
23 air chamber
25 intumescent material
25 surface structure
31 fuselage
32 spacer

The invention claimed is:

1. An arrangement, comprising: an outer skin portion, an outside of which comes into contact with the atmosphere; a facing portion, which is arranged on an inside of the outer skin portion; a gap which is formed between the outer skin portion and the facing portion; and a device configured to pass an airstream through the gap at a sufficient temperature to displace the dew point into the outer skin portion, wherein one or more heating members for increasing the temperature of the airstream passed through the gap are arranged in the facing portion, which heating members are distributed along the gap in a direction of movement of the airstream and configured to heat the airstream evenly over a spatial extent thereof such that the inside of the outer skin portion has an even temperature along the gap.

2. Arrangement according to claim 1, characterised in that the facing portion has acoustic and/or thermal insulation.

3. Arrangement according to claim 2, characterised in that the facing portion has one or more air chambers for thermal insulation.

4. Arrangement according to claim 3, characterised in that the facing portion comprises a foam comprising the air chambers.

5. Arrangement according to claim 1, characterised in that the facing portion is formed as a tube, which is arranged substantially coaxially in the outer skin portion which is also formed as a tube.

6. Arrangement according to claim 1, characterised in that the facing portion is coated with an intumescent material on the side thereof remote from the gap.

7. Arrangement according to claim 1, characterised in that the facing portion is formed with a noise-absorbing surface structure on the side thereof facing the gap.

8. Aircraft or spacecraft comprising an arrangement according to claim 1.

9. Aircraft or spacecraft according to claim 8, characterised in that the facing portion defines a cabin of the aircraft or spacecraft.

* * * * *